(12) United States Patent
Gao et al.

(10) Patent No.: US 7,697,724 B1
(45) Date of Patent: Apr. 13, 2010

(54) DISPLACEMENT DETERMINATION SYSTEM AND METHOD USING SEPARATED IMAGING AREAS

(75) Inventors: Jun Gao, Palo Alto, CA (US); Carl E. Picciotto, Palo Alto, CA (US); Ross R. Allen, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 11/438,843

(22) Filed: May 23, 2006

(51) Int. Cl.
*G06K 9/00* (2006.01)
*G01N 21/86* (2006.01)
(52) U.S. Cl. .................. 382/106; 250/559.29
(58) Field of Classification Search ................ 382/100, 382/106, 312; 250/208.1, 223, 225, 559.29, 250/559.36; 702/33, 41
See application file for complete search history.

(56) References Cited

U.S. PATENT DOCUMENTS

| | | | |
|---|---|---|---|
| 5,149,980 A | | 9/1992 | Ertel et al. |
| 5,204,739 A | | 4/1993 | Domenicali |
| 5,459,578 A | | 10/1995 | Park et al. |
| 6,118,132 A | * | 9/2000 | Tullis .................... 250/559.39 |
| 6,195,475 B1 | | 2/2001 | Beausoleil, Jr. et al. |
| 6,721,667 B2 | * | 4/2004 | Banes et al. ................. 702/41 |
| 6,770,899 B2 | * | 8/2004 | Hasegawa et al. ...... 250/559.29 |
| 6,777,084 B2 | * | 8/2004 | Nagaoka .................... 428/373 |

* cited by examiner

*Primary Examiner*—Abolfazl Tabatabai (57) ABSTRACT

A system including a data acquisition system and a processing system is provided. The data acquisition system is configured to capture a first reference frame that includes a first feature in a first imaging area on a substrate prior to a relative position between the data acquisition system and the substrate being adjusted by approximately a predetermined distance during a first time period, capture a first comparison frame that includes the first feature in a second imaging area on the substrate and a second reference frame that includes a second feature in the first imaging area on the substrate subsequent to the first time period, and capture a second comparison frame that includes the second feature in the second imaging area on the substrate subsequent to the relative position being adjusted by approximately the predetermined distance during a second time period that is subsequent to the first time period. The second imaging area is separated from the first imaging area by the predetermined distance. The processing system is configured to determine a displacement sum using a first displacement between the first feature in the first reference frame and the first feature in the first comparison frame and a second displacement between the second feature in the second reference frame and the second feature in the second comparison frame.

20 Claims, 10 Drawing Sheets

DISPLACEMENT DETERMINATION SYSTEM AND METHOD USING SEPARATED IMAGING AREAS

CROSS-REFERENCE TO RELATED APPLICATIONS

This application is related to U.S. patent application Ser. No. 10/930,206, filed Aug. 31, 2004, entitled DISPLACEMENT ESTIMATION SYSTEM AND METHOD, U.S. patent application Ser. No. 10/930,614, filed Aug. 31, 2004, entitled DISPLACEMENT ESTIMATION SYSTEM AND METHOD, and U.S. patent application Ser. No. 10/930,005, filed Aug. 31, 2004, entitled DISPLACEMENT ESTIMATION SYSTEM AND METHOD. Each of the above U.S. patent applications is assigned to the assignee of the present invention, and is hereby incorporated by reference herein.

BACKGROUND

Displacement sensing over large distances may involve the summation of multiple measurements from multiple steps where each step represents a distance between two points. Since each measurement is typically a stochastic process, measurement errors tend to accumulate in a random walk fashion. Although the error from each step may be small, the individual errors may accumulate. As a result, the accumulated measurement errors may reach unacceptably high levels.

For example, assume that a displacement takes 10,000 measurements and that each measurement error accumulates. Assuming that the measurement error is random and the distribution of a large number of measurements will then follow a random walk distribution (i.e., a simple stochastic process where each measurement has an error with a random magnitude and direction), this displacement provides a final measurement error that is equal to the product of the individual measurement step error and the square root of the number of measurement steps, $N_{step}$. Accordingly, the overall measurement error and the individual measurement errors, $e_{step}$, may be expressed as standard deviations as shown in Equation I.

$$\sigma_{final} = \sqrt{N_{step}} \times e_{step} = \sqrt{10,000} \times e_{step} = 100 \times e_{step} \qquad \text{Equation I}$$

It would be desirable to perform displacement sensing over large distances while minimizing the overall measurement error in a displacement.

SUMMARY

One form of the present invention provides a system including a data acquisition system and a processing system is provided. The data acquisition system is configured to capture a first reference frame that includes a first feature in a first imaging area on a substrate prior to a relative position between the data acquisition system and the substrate being adjusted by approximately a predetermined distance during a first time period, a first comparison frame that includes the first feature in a second imaging area on the substrate and a second reference frame that includes a second feature in the first imaging area on the substrate subsequent to the relative position being adjusted during the first time period, and a second comparison frame that includes the second feature in the second imaging area on the substrate subsequent to the relative position being adjusted by approximately the predetermined distance during a second time period that is subsequent to the first time period. The second imaging area is separated from the first imaging area by the predetermined distance. The processing system is configured to determine a displacement sum using a first displacement between the first feature in the first reference frame and the first feature in the first comparison frame and a second displacement between the second feature in the second reference frame and the second feature in the second comparison frame.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

A displacement estimation system and method using separated imaging areas is described herein. A data acquisition system forms the first and second imaging areas on a substrate. The first and second imaging areas are separated by a predetermined distance, D, such that they may be used to capture reference and comparison images, respectively, from separate areas of the substrate. The system and method contemplate capturing a reference image from the first imaging area that includes a feature of the substrate, adjusting a relative position between the system and the substrate by approximately the predetermined distance, capturing a comparison image from the second imaging area that includes the feature of the substrate, and calculating a displacement between the feature in the reference frame and the feature in the comparison frame.

These functions of the system and method may be repeated for any number of iterations. After each iteration, the total distance moved is shown in Equation II.

$$L = D + d \qquad \text{Equation II}$$

In Equation II, the total distance, L, is calculated by adding the predetermined distance, D, to the displacement, d. The total distances calculated in each iteration may be summed to generate a displacement sum that represents an estimate of the overall actual moved distance generated by adjusting the relative position between the system and the substrate over all of the iterations.

By providing separated imaging areas, the number of steps in a displacement operation may be reduced. For example, if the imaging areas are separated by a distance that is equal to ⅕ of the nominal displacement, then the displacement operation may be accomplished with five steps. Assuming that the measurement error at each step is random and the distribution follows a random walk distribution, this displacement operation provides a final measurement error that is equal to the product of the individual step error and the square root of the number of steps, $N_{SN\_step}$. Accordingly, the overall measurement error and the individual measurement errors, $e_{step}$, may be expressed as standard deviations as shown in Equation III.

$$\sigma_{final} = \sqrt{N_{SN\_step}} \times e_{step} = \sqrt{5} \times e_{step} = 2.236 \times e_{step} \qquad \text{Equation III}$$

When compared to the example described above with a displacement performed with 10,000 steps (shown in Equation I above), the standard deviation of the error improves by approximately 45 times as shown in Equation IV.

$$\frac{\sqrt{N_{step}} \times e_{step}}{\sqrt{N_{SN\_step}} \times e_{step}} = \sqrt{\frac{N_{step}}{N_{SN\_step}}} = \sqrt{\frac{10,000}{5}} \cong 45 \qquad \text{Equation IV}$$

Figure 1A:
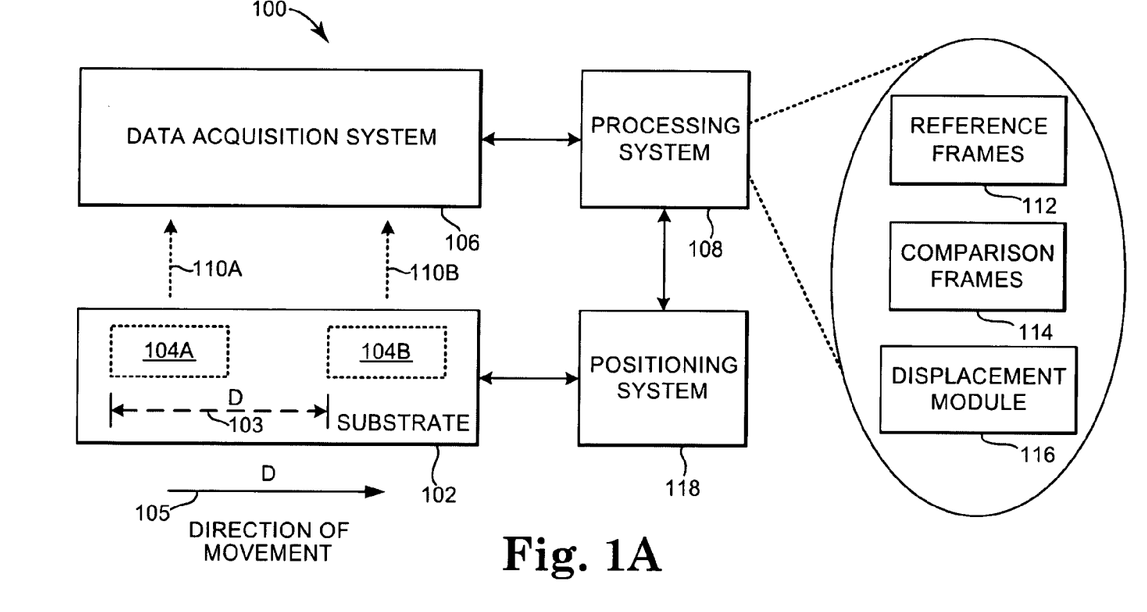
FIG. 1A is a block diagram illustrating one embodiment of displacement estimation system with separated imaging areas.

FIG. 1A is a block diagram illustrating one embodiment of displacement estimation system 100 with separated imaging areas 104A and 104B over a substrate 102. Imaging areas 104A and 104B are separated by a predetermined distance D as indicated by a dashed arrow 103.

Displacement estimation system 100 includes a data acquisition system 106, a processing system 108, and a positioning system 118. Data acquisition system 106 is configured to capture reference frames 112 using imaging area 104A and comparison frames 114 using imaging area 104B and provide the frames 112 and 114 to processing system 108. Processing system 108 includes a displacement module 116 that is configured to determine displacements between one or more features of substrate 102 using a reference frame 112 and a comparison frame 114. Processing system 108 also controls the operation of positioning system 118. Positioning system 118 adjusts the relative position between substrate 102 and data acquisition system 106 by the predetermined distance D as indicated by an arrow 105. More particularly, for each iteration, positioning system 118 adjusts the relative position by the predetermined distance D subsequent to a reference frame 112 being captured and prior to a comparison frame 114 being captured by data acquisition system 106. The predetermined distance D is calibrated to increase its accuracy as described in additional detail below.

Figure 1B:
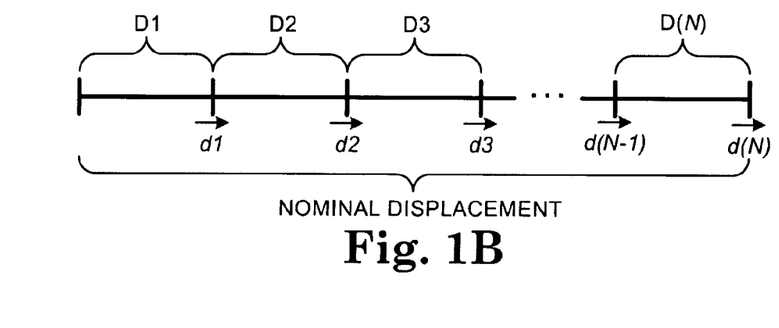
FIG. 1B is a diagram illustrating one embodiment of steps in a displacement operation.

FIG. 1B is a diagram illustrating one embodiment of steps in a displacement operation. In the displacement operation, positioning system 118 attempts to adjust the relative position between substrate 102 and data acquisition system 106 by the nominal displacement using steps D1 through D(N) of the predetermined distance D where N is greater than or equal to two. Processing system 108 determines displacements d1 through d(N) subsequent to steps D1 through D(N), respectively. The arrows for displacements d1 through d(N) in FIG. 1B are shown for illustrative purposes and are not intended to indicate a direction of displacements d1 through d(N). Processing system 108 determines the overall offset from the nominal displacement using displacements d1 through d(N) as described in additional detail below.

Substrate 102 may be any suitable one, two, or three dimensional work object such as paper, a silicon or other type of semiconductor wafer, a web of material, and a drum or other non-flat object. The term "web of material" covers both a web of material that carries objects (e.g., a conveyor) and the surface of a work object that is moveable relative to displacement estimation system 100.

Substrate 102 includes any type of naturally occurring or man-made features that may be captured by data acquisition system 106. The features may be readily visible to a human observer, visible only in response to an applied illumination field, or visible only using data acquisition system 106. The features may cover a large or a small area of substrate 102. The features may be created as a result of a fabrication process or produced concurrently to the use of this invention.

Data acquisition system 106 comprises any suitable optical or non-optical system configured to acquire reference frames 112 and comparison frames 114 from substrate 102. Data acquisition system 106 captures frames 112 and 114 to allow processing system 108 to perform a correlation between a set of one or more features of substrate 102 in each frame 112 and 114. Examples of optical systems include one or more cameras or other devices configured to optically capture reference frames 112 and comparison frames 114. Examples of non-optical systems include electron beam devices or other devices configured to capture reference frames 112 and comparison frames 114 using non-optical means.

Data acquisition system 106 has a resolution and a scale appropriate for the type of substrate 102. The resolution may be pixel, sub-pixel, or another suitable resolution, and the scale may be nanometer scale or another suitable resolution. Reference frames 112 and comparison frames 114 comprise any set of optical or non-optical images that include data that may be used to identify the relative locations of features of substrate 102 within frames 112 and 114.

Data acquisition system 106 captures each reference frame 112 using imaging area 104A as indicated by a dashed arrow 110A. Data acquisition system 106 captures each comparison frame 114 using imaging area 104B as indicated by a dashed arrow 110B. Data acquisition system 106 is configured such that imaging areas 104A and 104B are separated by the predetermined distance D. Accordingly, data acquisition system 106 uses imaging areas 104A and 104B to capture reference and comparison frames 112 and 114, respectively, from separate areas of substrate 102. Reference frames 112 and comparison frames 114 may be any suitable size, such as 46 by 46 pixels in one embodiment.

In one embodiment, the areas of substrate 102 covered by imaging areas 104A and 104B are mutually exclusive and separated by any suitable distance that is greater than the length of imaging areas 104A and 104B in the direction of movement. In other embodiments, the areas of substrate 102 covered by imaging areas 104A and 104B may partially, but not fully, overlap, i.e., the predetermined distance that separates imaging areas 104A and 104B is greater than zero but may be less than or equal to the length of imaging areas 104A and 104B in the direction of movement.

Figure 2A:
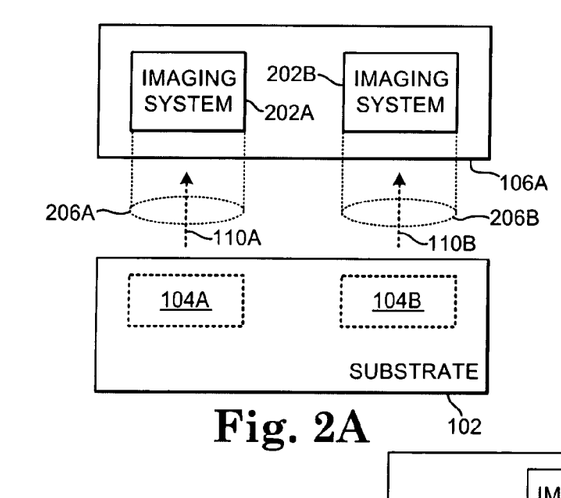
FIGS. 2A-2C are schematic diagrams illustrating embodiments of data acquisition systems with separated imaging areas.
Figure 2B:
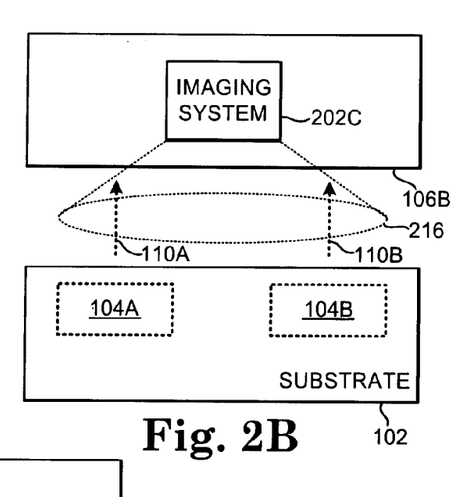
Figure 2C:
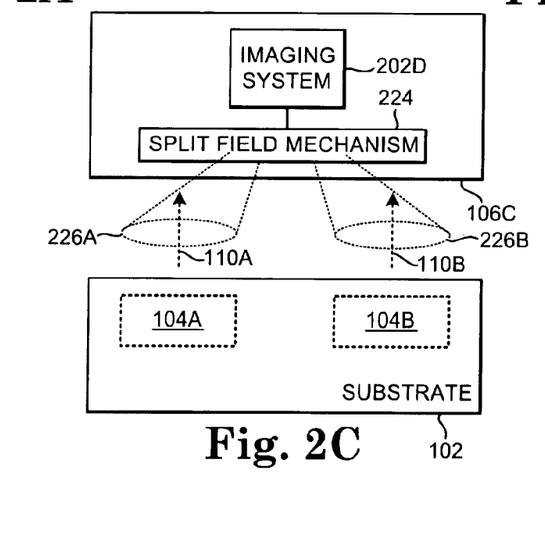

Data acquisition system 106 may be configured in various ways to form imaging areas 104A and 104B that are separated by the predetermined distance. FIGS. 2A-2C are schematic diagrams illustrating embodiments 106A, 106B, and 106C of data acquisition system 106, respectively.

In the embodiment of FIG. 2A, data acquisition system 106A includes imaging systems 202A and 202B. Imaging system 202A has a field of view 206A that includes imaging area 104A, and imaging system 202B has a field of view 206B that includes imaging area 104B. The size of fields of view 206A and 206B may be greater than or equal to the size of imaging areas 104A and 104B, respectively.

In one implementation of the embodiment of FIG. 2A, the size of fields of view 206A and 206B are greater than the size of imaging areas 104A and 104B, respectively, such that imaging areas 104A and 104B are selected windows within fields of view 206A and 206B, respectively. The selected windows that form imaging areas 104A and 104B may be determined during a calibration procedure as described in additional detail below. In another implementation, the size of fields of view 206A and 206B are equal to the size of imaging areas 104A and 104B, respectively.

In the embodiment of FIG. 2B, data acquisition system 106B includes an imaging system 202C. Imaging system 202C has a field of view 216 that encompasses both imaging area 104A and imaging area 104B. Accordingly, imaging areas 104A and 104B form selected windows within field of view 216. The selected windows that form imaging areas 104A and 104B may be determined during a calibration procedure as described in additional detail below.

In the embodiment of FIG. 2C, data acquisition system 106C includes an imaging system 202D and split field mechanism 224. Split field mechanism 224 form fields of view 226A and 226B of imaging system 202D where field of view 226A includes imaging area 104A and field of view 226B includes imaging area 104B. Split field mechanism 224 includes any suitable optical or non-optical components configured to form fields of view 226A and 226B of imaging system 202D.

In one implementation of the embodiment of FIG. 2C, the size of fields of view 226A and 226B are greater than the size of imaging areas 104A and 104B, respectively, such that imaging areas 104A and 104B are selected windows within fields of view 226A and 226B, respectively. The selected windows that form imaging areas 104A and 104B may be determined during a calibration procedure as described in additional detail below. In another implementation, the size of fields of view 226A and 226B are equal to the size of imaging areas 104A and 104B, respectively.

Data acquisition system 106 provides the captured reference frames 112 and comparison frames 114 to processing system 108. Processing system 108 receives and stores reference frames 112 and comparison frames 114. Processing system 108 processes reference frames 112 and comparison frames 114 using displacement module 116. Using displacement module 116, processing system 108 identifies or locates a set of one or more features in a reference frame 112 and identifies or locates the same set of one or more features in a corresponding comparison frame 114. Processing system 108 determines a displacement between the set of features in reference frame 112 and comparison frame 114. Processing system 108 may determine the displacement to a pixel or sub-pixel resolution.

Displacement module 116 may embody any suitable algorithm for calculating displacements between the set of features. Suitable algorithms may include an image cross-correlation algorithm, a phase delay detection algorithm, or other displacement estimation algorithms.

With the image cross-correlation algorithm, displacement module 116 uses image cross-correlations to calculate a displacement. One example of an image cross-correlation algorithm is a nearest neighbor-pixel navigation algorithm. With the nearest neighbor-pixel navigation algorithm, displacement module 116 uses image cross-correlations or comparison functions which approximate or parallel pixel-by-pixel correlation functions to calculate the displacement. The nearest neighbor-pixel navigation algorithm uses very short correlation distances in calculating the displacement.

The nearest neighbor-pixel navigation algorithm analyzes image cross-correlations to determine image displacements by directly locating the peak of the correlation surface to the nearest pixel or by curve-fitting the correlation surface to some function and then determining the location of the maximum (or minimum) value, often to sub-pixel precision. The correlation function used in the nearest neighbor-pixel navigation algorithm is defined by Equation V.

$$C_{i,j}^K = \sum_{m=1}^{M} \sum_{n=1}^{N} |r_{m,n} - c_{m-i,n-j}|^k \quad \text{Equation V}$$

In Equation V, $C_{i,j}^K$ is the correlation surface, $r_{m,n}$ and $c_{m,n}$ represent the pixel values of reference frames 112 and comparison frames 114, respectively, and k is some exponent such as 2. The correlation surface is then fit to a curve, and the extremum of this curve (for the case of this correlation function, it is a global minimum point) is deduced, thereby determining the displacement vector to sub-pixel precision. Any function that results in an extremum at the point of closest image matching could be incorporated into such a scheme.

Figure 3:
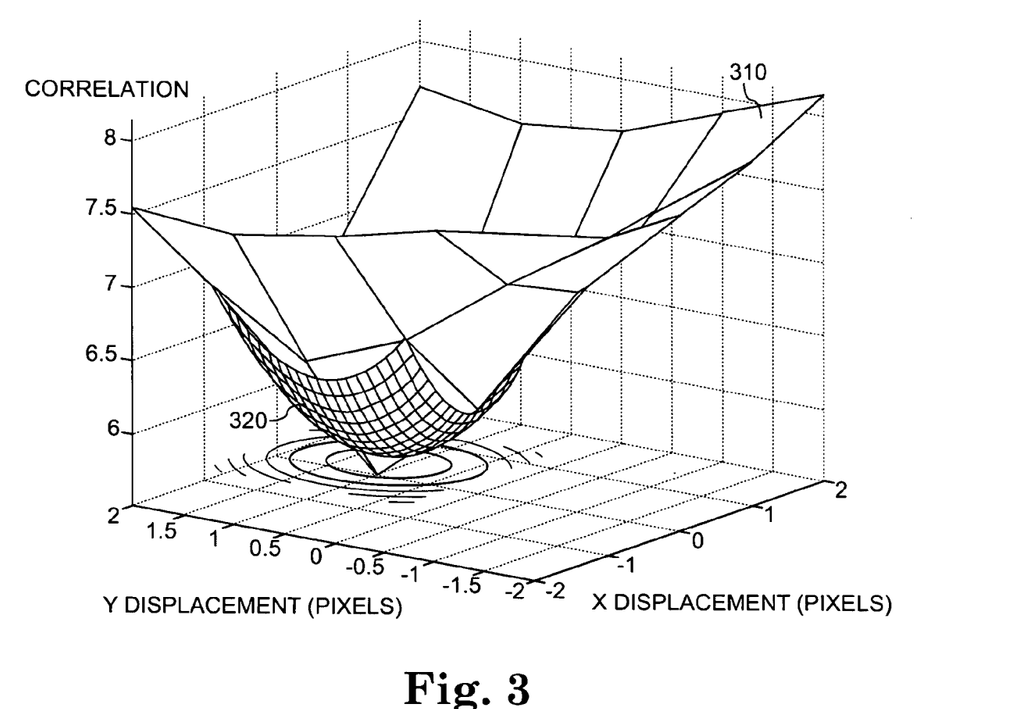
FIG. 3 is a graphical diagram illustrating a correlation surface.

FIG. 3 is a graphical diagram illustrating a correlation surface 310 generated using Equation V with a +/-2 pixel displacements. A fitting function 320 adjusted to contain the minimum of correlation surface 310. In the example of FIG. 3, fitting function 320 is a simple second-order Taylor Series expansion. The interpolated minimum position is calculated and forms the final measured displacement. The nearest neighbor-pixel navigation algorithm provides a close-formed analytical solution of displacement from all correlation values. The nearest neighbor-pixel navigation algorithm may provide the best estimation of a displacement if reference frames 112 and comparison frames 114 are displaced within +/-½ pixel. Beyond +/-±½ pixel, the error in calculating the displacement may increase. The values on the z-axis of the diagram of FIG. 3 may be to the $10^4$ power or any other suitable scale.

Additional details of nearest neighbor navigation algorithms may be found in U.S. Pat. No. 5,149,980 entitled "SUBSTRATE ADVANCE MEASUREMENT SYSTEM USING CROSS-CORRELATION OF LIGHT SENSOR ARRAY SIGNALS" listing Ertel et al. as inventors and U.S. Pat. No. 6,195,475 entitled "NAVIGATION SYSTEM FOR HANDHELD SCANNER" listing Beausoleil et al. as inventors. Each of these patents is hereby incorporated by reference herein.

With the phase delay detection algorithm (and other similar phase correlation methods), displacement module 116 processes images converted to a frequency domain representation and calculates a displacement through phase differences between a reference frame 112 and a comparison frame 114.

Functions performed by processing system 108 and/or displacement module 116 may be implemented in hardware, software, firmware, or any combination thereof. The implementation may be via a microprocessor, programmable logic device, or state machine. Components of the present invention, e.g., displacement module 116, may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Positioning system 118 adjusts the relative position between substrate 102 and data acquisition system 106 in response to signals from processing system 108. During a multi-step displacement, positioning system 118 adjusts the relative position by the predetermined distance D at each step of the displacement. In one embodiment, positioning system 118 adjusts the relative position between substrate 102 and data acquisition system 106 by moving substrate 102 relative to data acquisition system 106. In another embodiment, positioning system 118 adjusts the relative position between substrate 102 and data acquisition system 106 by moving data acquisition system 106 relative to substrate 102. In a further embodiment, positioning system 118 adjusts the relative position between substrate 102 and data acquisition system 106 by moving both substrate 102 and data acquisition system 106 relative to one another.

The operation of displacement estimation system 100 will now be described with reference to the embodiments shown in FIGS. 4A and 4B.

Figure 4A:
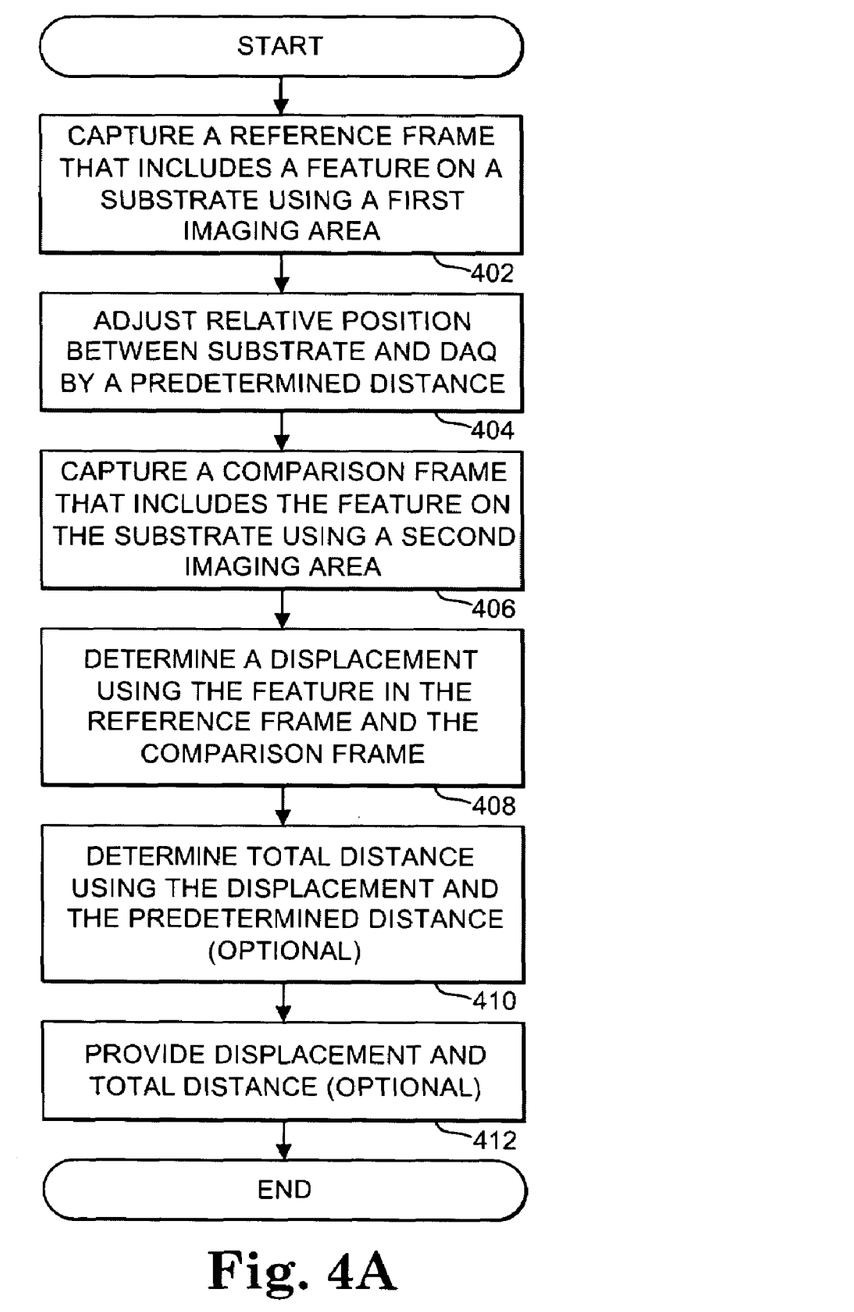
FIG. 4A is a flow chart illustrating one embodiment of a method for calculating a displacement using separated imaging areas.

FIG. 4A is a flow chart illustrating one embodiment of a method for determining a displacement using separated imaging areas. For illustrative purposes, the method of FIG. 4A will be described with reference to displacement estimation system 100 of FIG. 1A.

In FIG. 4A, data acquisition system 106 captures a reference frame 112 that includes a feature on substrate 102 using imaging area 104A as indicated in a block 402. Data acquisition system 106 captures the reference frame 112 in response to a signal from processing system 108 and provides the reference frame 112 to processing system 108.

Subsequent to capturing the reference frame 112, positioning system 118 adjusts a relative position between substrate 102 and data acquisition system 106 by a predetermined distance D as indicated in a block 404. As noted above, positioning system 118 may adjust the relative position by moving substrate 102, data acquisition system 106, or the combination of moving substrate 102 and data acquisition system 106.

Subsequent to the relative position being adjusted, data acquisition system 106 captures a comparison frame 114 that includes the feature on substrate 102 using imaging area 104B as indicated in a block 406. Data acquisition system 106 captures the comparison frame 114 in response to a signal from processing system 108 and provides the comparison frame 114 to processing system 108.

Processing system 108 determines a displacement, d, of the feature in the reference frame 112 and the comparison frame 114 as indicated in a block 408. More particularly, displacement module 116 calculates the displacement of the feature in the reference frame 112 and the comparison frame 114 using any suitable algorithm as described above.

Processing system 108 optionally determines a total distance using the displacement and the predetermined distance as indicated in a block 410. Because imaging areas 104A and 104B are separated by the predetermined distance and positioning system 118 adjusted the relative position by the predetermined distance, processing system 108 calculates the total distance, L, by adding the predetermined distance, D, to the displacement, d, as shown in Equation II above.

The standard deviation of the displacement estimation uncertainty of distance L is represented in Equation VI.

$$\sigma_{SN} = \sqrt{e_{step}^2 + e_{SN}^2 + e_{sys}^2} \qquad \text{Equation VI}$$

In Equation VI, $e_{step}$ is the standard deviation of the error from a single step displacement d, $e_{SN}$ is the standard deviation of the error in calibrating the predetermined distance D, and $e_{sys}$ derives from other system errors including optical and sensor mismatching and distortions. By configuring displacement estimation system 100 such that $e_{SN}$ and $e_{sys}$ are small, displacement estimation system 100 may provide significant error reduction compared to the error generated by performing a displacement operation over the predetermined distance D with multiple steps.

Processing system 108 optionally provides the displacement and the total distance to any suitable system as indicated in a block 412. The suitable system may include a functional unit, a storage device, another processing system, or another component within processing system 108 (not shown).

The embodiment of FIG. 4A illustrates a displacement operation with a single step of the predetermined distance. FIG. 4B is a flow chart illustrating one embodiment of a method for calculating displacements using separated imaging areas with any number of steps of the predetermined distance. The embodiment of FIG. 4B will be described with reference to the embodiment of FIG. 1A and the examples shown in FIGS. 5A-5C and 6A-6B.

Figure 4B:
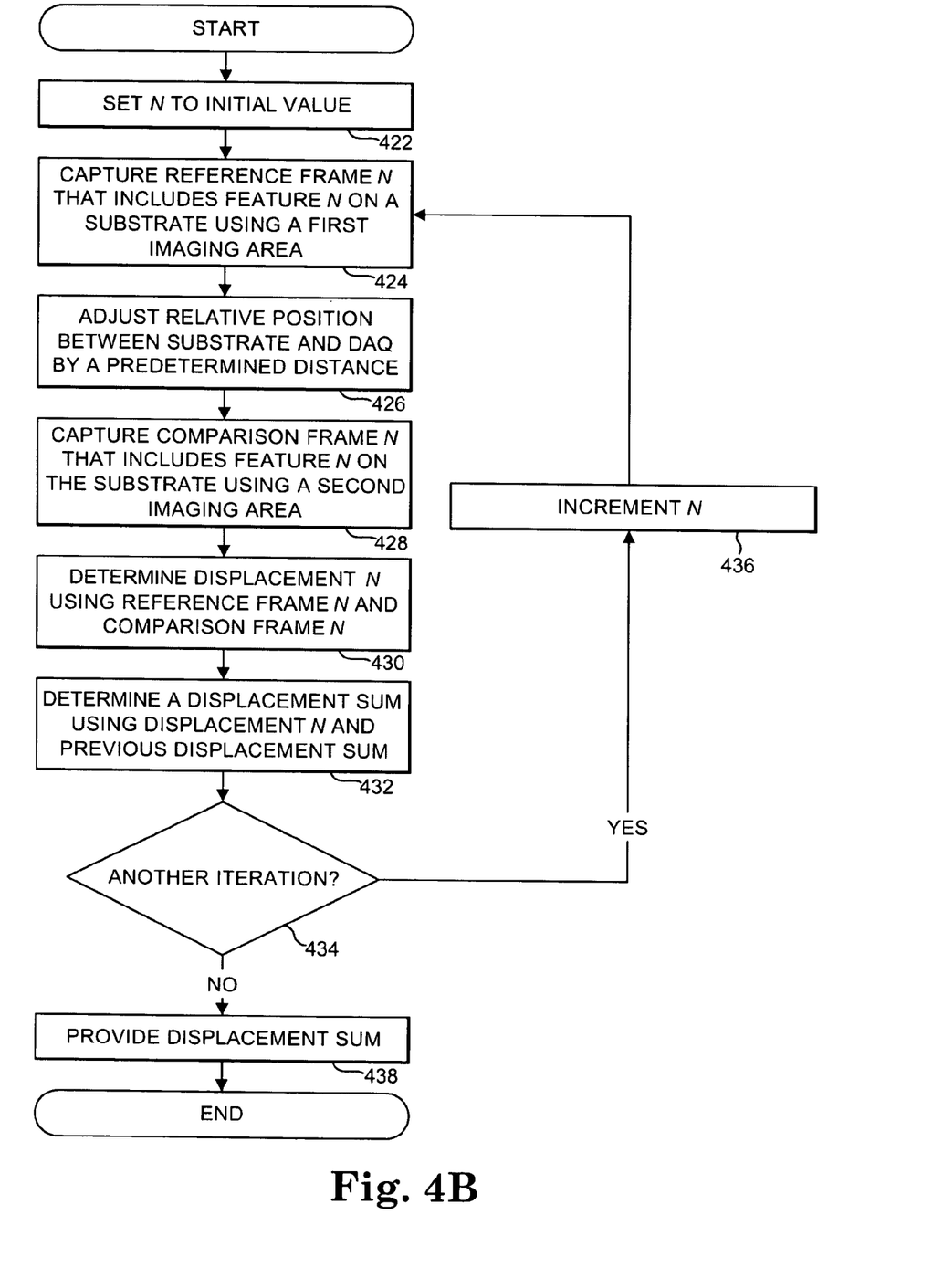
FIG. 4B is a flow chart illustrating one embodiment of a method for calculating displacements using separated imaging areas.

In FIG. 4B, processing system 108 sets a variable N to an initial value (e.g., N=1) as indicated in a block 422. The variable N may be used to track the number of measurement steps in a displacement operation.

Figure 5A:
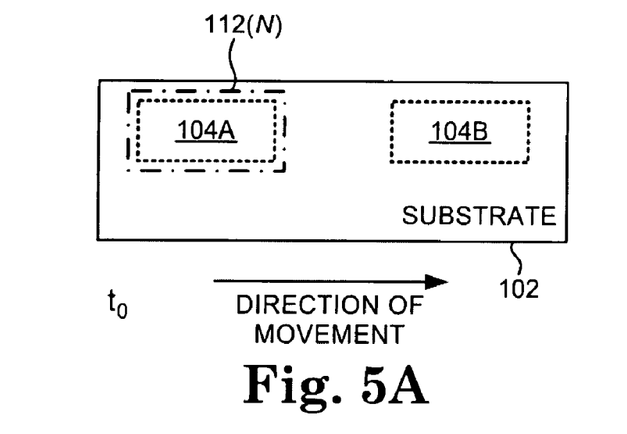
FIGS. 5A-5C are schematic diagrams illustrating examples of capturing reference and comparison frames using separated imaging areas.
Figure 6A:
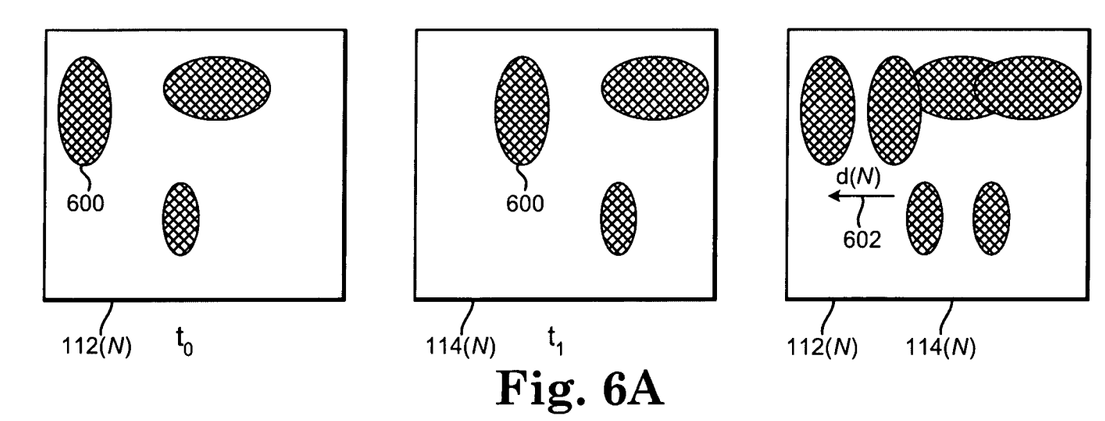
FIGS. 6A-6B are schematic diagrams illustrating examples of calculating displacements using separated imaging areas.

Data acquisition system 106 captures a reference frame 112(N) at a time $t_0$ that includes a feature 600 on substrate 102 using imaging area 104A as indicated in a block 424. As shown in FIG. 5A, the area of reference frame 112(N) on substrate 102 includes imaging area 104A at time $t_0$. Reference frame 112(N) is also shown in FIG. 6A with feature 600 at time $t_0$.

Subsequent to capturing the reference frame 112(N) at time $t_0$, positioning system 118 adjusts a relative position between substrate 102 and data acquisition system 106 by a predetermined distance D as indicated in a block 426.

Figure 5B:
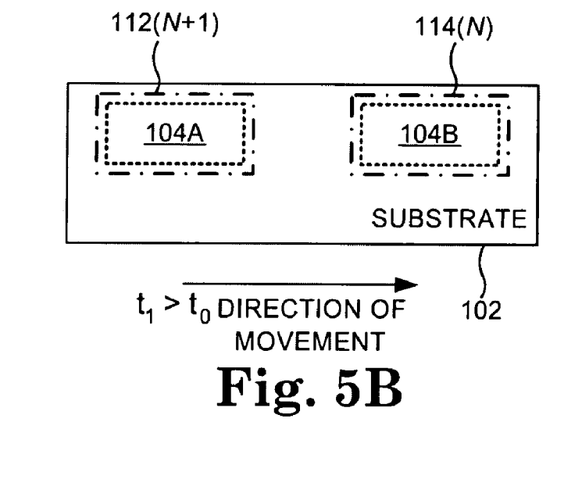

At a time $t_1$ that is subsequent to time $t_0$, data acquisition system 106 captures a comparison frame 114(N) that includes feature 600 on substrate 102 using imaging area 104B as indicated in a block 428. In FIG. 5B, the area of comparison frame 114(N) on substrate 102 includes imaging area 104B at a time $t_1$. Comparison frame 114(N) is also shown in FIG. 6A with feature 600 at time $t_1$.

Processing system 108 determines a displacement, d(N), of feature 600 in reference frame 112(N) and comparison frame 114(N) as indicated in a block 430. More particularly, displacement module 116 calculates the displacement of feature 600 in reference frame 112(N) and comparison frame 114(N) using any suitable algorithm as described above. In FIG. 6A, the displacement d(N) is shown by an arrow 602 in the overlapping reference frame 112(N) and comparison frame 114(N).

Processing system 108 determines a displacement sum using the displacement d(N) and the previous displacement sum as indicated in a block 432. On the first iteration of performing the function of block 432, the previous displacement sum is equal to zero. On the second and subsequent iterations, the previous displacement sum is the displacement sum determined in performing the function of block 432 in the previous iteration.

In one embodiment, the displacement sum includes only the sum of the displacements calculated by processing system 108 in performing the function block 430. In this embodiment, the displacement sum represents the overall offset from the nominal displacement that is generated by the steps in the displacement operation. In other embodiments, the displacement sum includes the predetermined distance along with the displacement and the previous displacement sum at each iteration. In this embodiment, the displacement sum represents the total actual displacement of the displacement operation where the total displacement may be compared to a nominal displacement to determine the overall offset from the nominal displacement that is generated by the steps in the displacement operation.

A determination is made by processing system 108 as to whether another iteration is to be performed as indicated in a block 434. Processing system 108 determines whether another iteration is to be performed by comparing the variable N to a predefined value according to one embodiment. In other embodiments, processing system 108 determines whether another iteration is to be performed in any other suitable way. If another iteration is to be performed, then processing system 108 increments the variable N as indicated in a block 436.

Figure 5C:
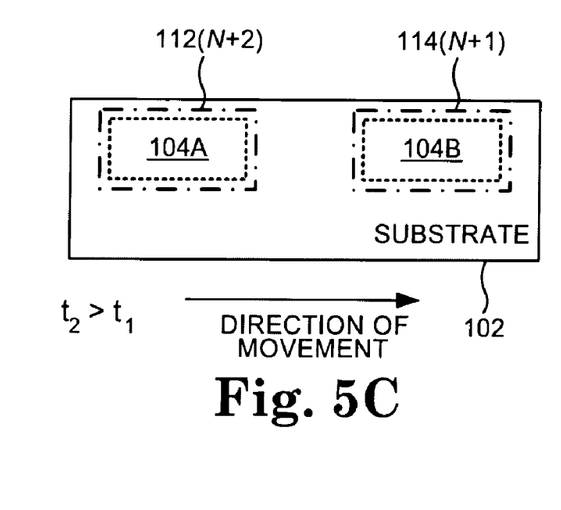
Figure 6B:
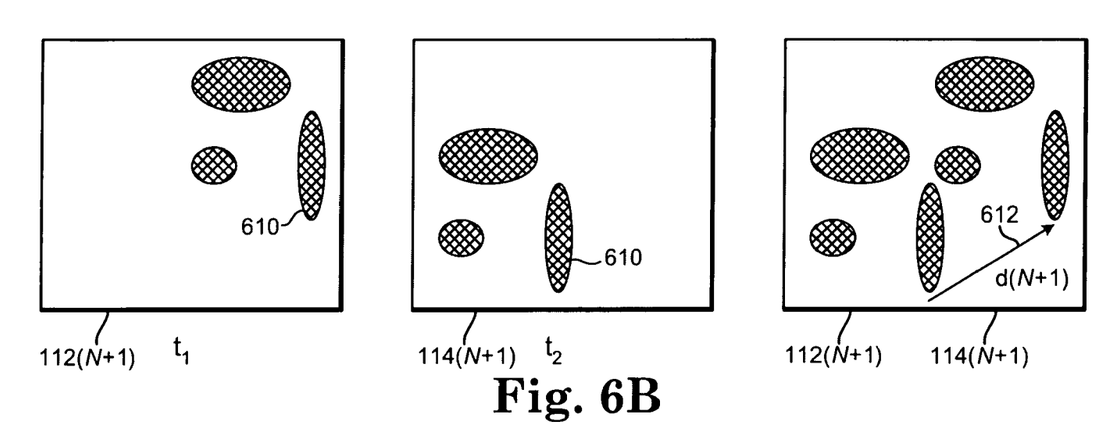

FIGS. 5B, 5C, and 6B illustrate a second iteration of the method of FIG. 4B. In the second iteration, data acquisition system 106 captures a reference frame 112(N+1) at time $t_1$ that includes a feature 610 on substrate 102 using imaging area 104A as indicated in block 424. As shown in FIG. 5B, the area of reference frame 112(N+1) on substrate 102 includes imaging area 104A at time $t_0$. Reference frame 112(N+1) is also shown in FIG. 6B with feature 610.

Subsequent to capturing the reference frame 112(N+1) at time $t_1$, positioning system 118 adjusts a relative position between substrate 102 and data acquisition system 106 by the predetermined distance D as indicated in block 426.

At a time $t_2$ that is subsequent to time $t_1$, data acquisition system 106 captures a comparison frame 114(N+1) that includes feature 610 on substrate 102 using imaging area 104B as indicated in a block 428. In FIG. 5C, the area of comparison frame 114(N+1) on substrate 102 includes imaging area 104B at a time $t_2$. Comparison frame 114(N+1) is also shown in FIG. 6B with feature 610.

Processing system 108 determines a displacement, d(N+1), of feature 610 in reference frame 112(N+1) and comparison frame 114(N+1) as indicated in block 430. More particularly, displacement module 116 calculates the displacement of feature 610 in reference frame 112(N+1) and comparison frame 114(N+1) using any suitable algorithm as described above. In FIG. 6A, the displacement d(N+1) is shown by an arrow 612 in the overlapping reference frame 112(N+1) and comparison frame 114(N+1).

Processing system 108 determines a displacement sum using the displacement d(N+1) and the previous displacement sum (i.e., displacement d(N)) as indicated in block 432. Accordingly, the displacement sum in this iteration is the sum of displacement d(N+1) and displacement d(N).

To perform a third iteration, data acquisition system 106 captures a reference frame 112(N+2) at time $t_2$ as indicated by block 424 and shown in FIG. 5C. The functions of blocks 426 through 434 are then repeated.

After all iterations are performed, processing system 108 provides the displacement sum to any suitable system as indicated in a block 438. The suitable system may include a functional unit, a storage device, another processing system, or another component within processing system 108 (not shown).

In one embodiment of the method of FIG. 4B, the functions of blocks 424 and 428 are performed simultaneously on the second and subsequent iterations of the method. Accordingly, reference frame 112(N+1) is captured at the same time as comparison frame 114(N). By doing so, positioning system 118 may continuously adjust the relative position between substrate 102 and data acquisition system 106. Data acquisition system 106 captures successive reference frames 112 and comparison frames 114 each time positioning system 118 adjusts the relative position between substrate 102 and data acquisition system 106 by the predetermined distance. The functions of blocks 430 and 432 may be performed any time after a comparison frame 114 is captured in block 428.

To maximize the accuracy of the nominal displacement of substrate 102, the predetermined distance between imaging areas 104A and 104B may be calibrated. The calibration of the predetermined distance may involve arranging imaging areas 104A and 104B to approximate the predetermined distance and then measuring the exact distance between imaging areas 104A and 104B to identify the exact predetermined distance. The calibration may be performed during one time (e.g., during the manufacture of displacement estimation system 100) or periodically during the operation of displacement estimation system 100.

To arrange imaging areas 104A and 104B to approximate the predetermined distance, data acquisition system 106 is configured to capture sharp edged, high contrast images of a sharp edged microrule (not shown). For example, in an embodiment where the desired predetermined distance is 12 mm with an accuracy of less than 300 nm, a microrule with edges of less than 20 nm may be used.

Figure 7A:
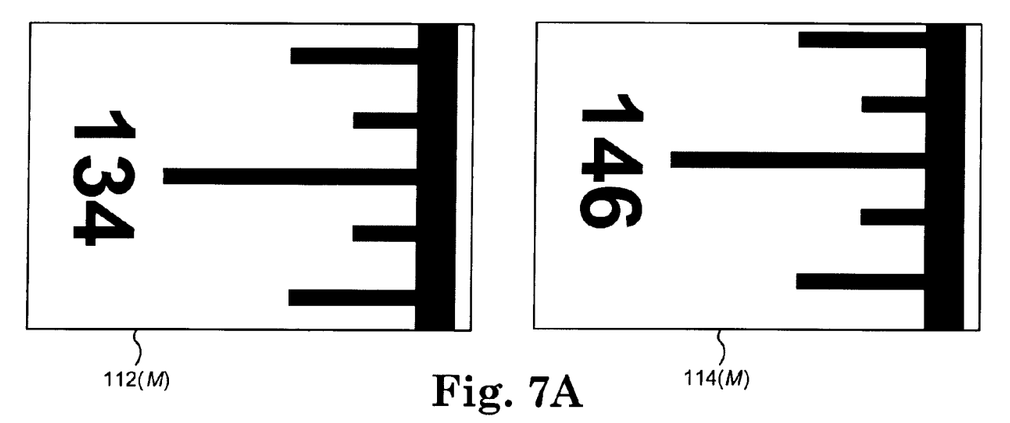
FIGS. 7A-7C are schematic diagrams illustrating examples of a portion of a calibration process for a displacement estimation system with separated imaging areas.

In embodiments where imaging systems or split field mechanisms are physically moved to approximate the predetermined distance (e.g., FIG. 2A or 2C) between imaging areas 104A and 104B, a precision translation table (not shown) may be used to move data acquisition system 106 to approximate the predetermined distance. In embodiments where windows in a field of view of an imaging systems are selected (e.g., FIG. 2B) as imaging areas 104A and 104B, The microrule is positioned parallel to the axis of imaging areas 104A and 104B and the direction of movement of substrate 102. Data acquisition system 106 captures the microrule in reference frames 112 and comparison frames 114 using imaging areas 104A and 104B. As shown in the example of FIG. 7A, data acquisition system 106 captures the microrule in reference frame 112(M) at the 134 mm mark and comparison frame 114(M) at the 146 mm mark (i.e., approximately 12 mm apart).

Figure 7B:
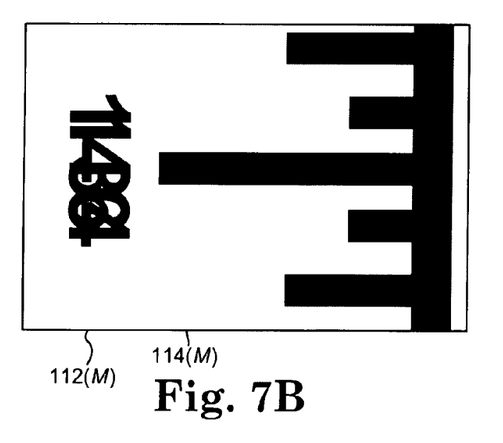

FIG. 7B illustrates the relative positions of the microrule in reference frame 112(M) and comparison frame 114(M) by overlapping the two frames. As shown in FIG. 7B, processing system 108 determines that the microrule images in reference frame 112(M) and comparison frame 114(M) do not exactly align by comparing reference frame 112(M) and comparison frame 114(M). Accordingly, the approximate predetermined distance is more or less than the desired 12 mm. In one embodiment, processing system 108 compares a single row of reference frame 112(M) and comparison frame 114(M) to determine whether the microrule images align. In other embodiments, processing system 108 compares other portions of reference frame 112(M) and comparison frame 114(M) to make the determination.

Figure 7C:
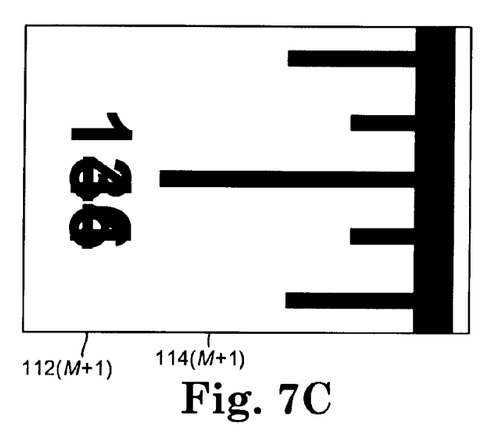

The calibration process continues by adjusting a position of imaging areas 104A and 104B and capturing additional reference frames 112 and comparison frames 114 until the microrule images align as shown by overlapping reference frame 112(M+1) and comparison frame 114(M+1) in FIG. 7C. The position of imaging areas 104A and 104B may be physically adjusted by the precision translation table or virtually adjusted by selecting windows for imaging areas 104A and 104B within a field of view of data acquisition system 106.

After the approximate predetermined distance is achieved, the precision translation table may be used to step imaging areas 104A and 104B over a range using relatively small distances (e.g., 100 steps of 200 nm) where data acquisition system 106 captures the microrule in a reference frame 112 and in a comparison frame 114 at each step. Processing system 108 processes the reference frames 112 and the comparison frames 114 to determine the exact distance between imaging areas 104A and 104B to a sub-pixel accuracy. For example, processing system 108 may separately plot the sum of a single pixel row for the set of reference frames 112 and the set of comparison frames 114 and fit the plots with a $10^{th}$ order polynomial (or other suitable function) to estimate the peak positions of each plot. From the peaks, processing system 108 determines the exact predetermined distance between imaging areas 104A and 104B and uses this exact predetermined distance as the predetermined distance described above with reference to FIGS. 1-6B.

Figure 8A:
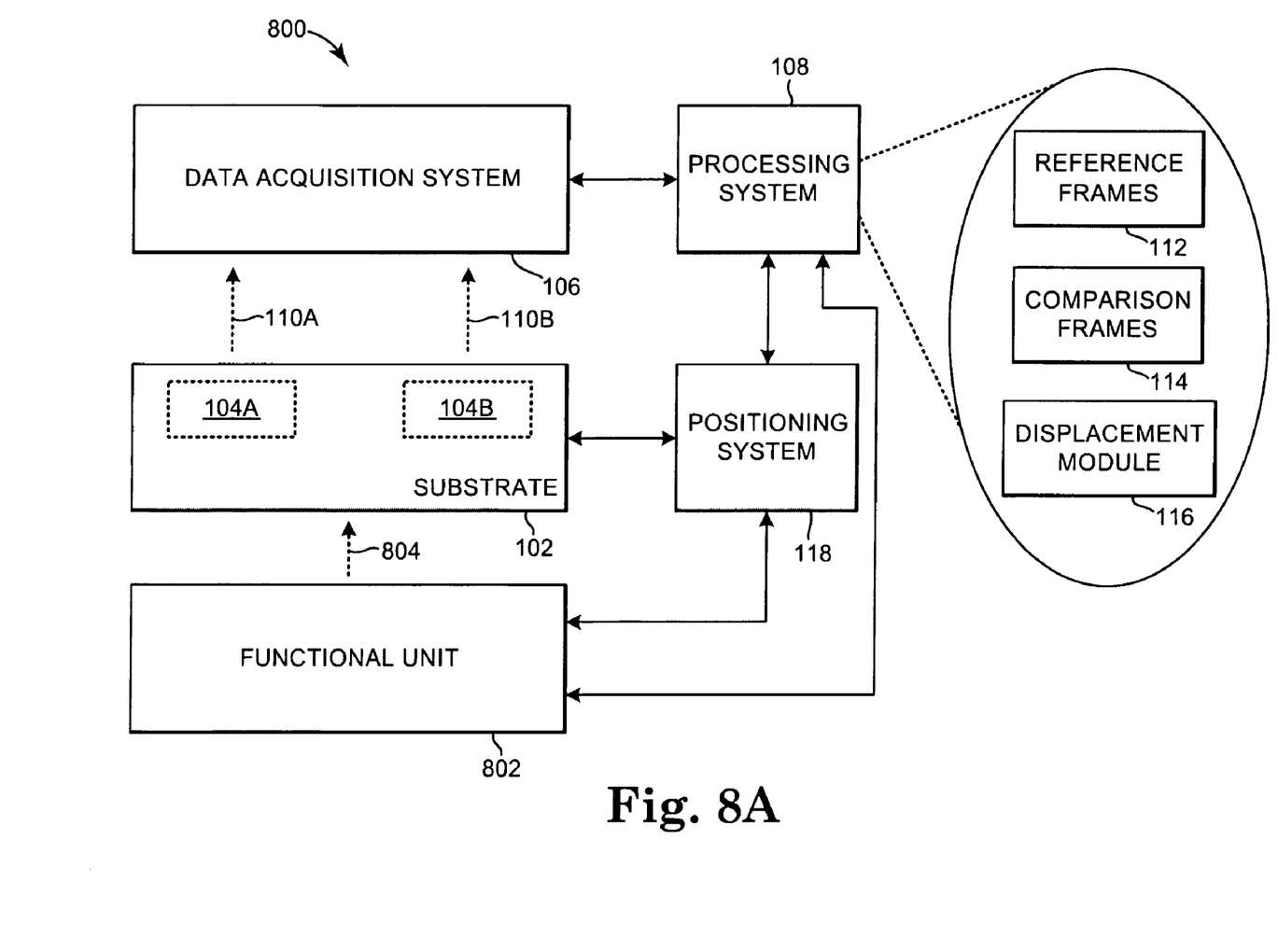
FIG. 8A is a block diagram illustrating one embodiment of a displacement estimation system with separated imaging areas and a functional unit.

FIG. 8A is a block diagram illustrating one embodiment of a displacement estimation system 800 with separated imaging areas 104A and 104B and a functional unit 802. Functional unit 802 may be any suitable system or apparatus that is configured to perform an operation on substrate 102 in accordance with a displacement determined by processing system 106 using imaging areas 104A and 104B as indicated by a dashed arrow 804.

In system 800, the relative position between data acquisition system 106 and functional unit 802 is fixed such that positioning system 118 moves data acquisition system 106 and functional unit 802 in unison when adjusting the relative position between data acquisition system 106 and substrate 102. Accordingly, displacement estimation system 800 adjusts the relative position between substrate 102 and functional unit 802 in the process of adjusting the relative position between substrate 102 and data acquisition system 106.

Displacement estimation system 800 is configured to perform displacement operations as described above with reference to FIGS. 1-6B. Displacement estimation system 800 is configured to use the displacement, displacement sum, or total distance determined by processing system 108 to adjust the operation of functional unit 802. Displacement estimation system 800 adjusts the operation of functional unit 802 using the displacement, displacement sum, or total distance subsequent to all adjustments by the predetermined distance being performed (e.g., adjustments shown in block 404 of FIG. 4A and block 426 of FIG. 4B). Accordingly, displacement estimation system 800 uses the displacement, displacement sum, or total distance to compensate for any offset from the nominal displacement.

In one embodiment, processing system 108 causes positioning system 118 to adjust the relative position between substrate 102 and functional unit 802 to a precise position using the displacement, displacement sum, or total distance. Functional unit 802 then performs an operation on substrate 102 at a location determined by the precise position between substrate 102 and functional unit 802. For example, positioning system 118 may adjust the relative position between substrate 102 and functional unit 802 by the displacement sum from a multi-step displacement operation to allow functional unit 802 to form a pattern on a precise location of substrate 102.

Displacement estimation system 800 may capture one or more additional comparison frames 114 as positioning system 118 adjusts the relative position between substrate 102 and functional unit 802 to a final desired displacement. By doing so, displacement estimation system 800 may compare each successive comparison frame 114 to the final reference frame 112 until a displacement between comparison frame 114 and the final reference frame 112 meets the final desired displacement.

Displacement estimation system 800 may also perform optical navigation using one or both imaging areas 104A and 104B positioning system 118 adjusts the relative position between substrate 102 and functional unit 802 to a final desired displacement. To do so, displacement estimation system 800 captures successive reference images 112 using imaging area 104A or successive comparison images 114 using imaging area 104B. Displacement estimation system 800 determines displacements between successive reference images 112 or successive comparison images 114 until the final desired displacement is achieved. Displacement estimation system 800 may also perform optical navigation using both imaging areas 104A and 104B and the final desired displacement is achieved using the displacements calculated from both navigations (e.g., by averaging the displacements).

In another embodiment, functional unit 802 uses the displacement, displacement sum, or total distance to perform an operation at a location on substrate 102 indicated by the displacement, displacement sum, or total distance. In this embodiment, functional unit 802 makes internal adjustments using the displacement, displacement sum, or total distance to cause the operation to be performed at the location on substrate 102 without adjusting the relative position between substrate 102 and functional unit 802. For example, functional unit 102 may adjust an internal apparatus to form a pattern on a precise location of substrate 102 using the displacement sum from a multi-step displacement operation.

Figure 8B:
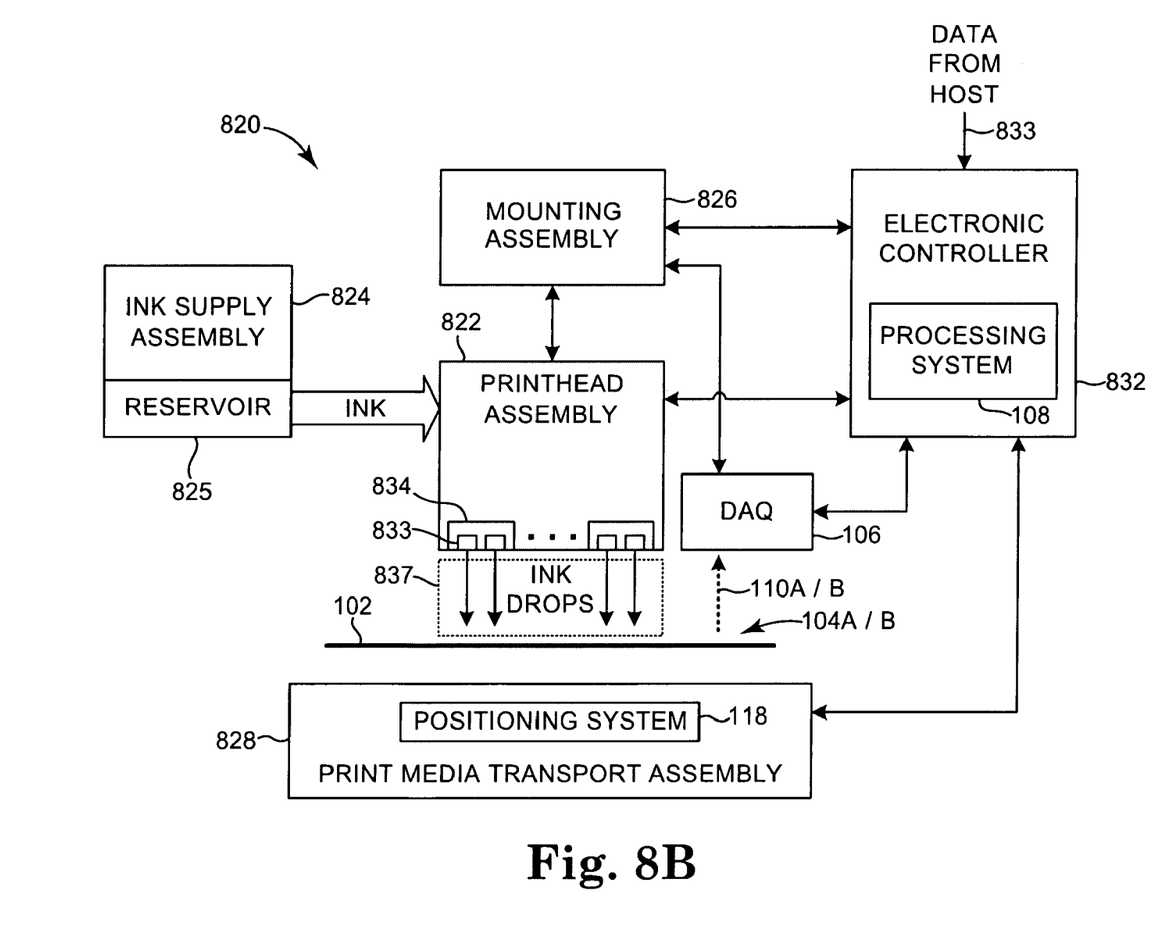
FIG. 8B is a block diagram illustrating one embodiment of an inkjet printing system with a displacement estimation system with separated imaging areas.

FIG. 8B is a block diagram illustrating one embodiment of an inkjet printing system 820 with displacement estimation system 800 with separated imaging areas 104A and 104B incorporated therein. Inkjet printing system 820 includes an inkjet printhead assembly 822, an ink supply assembly 824, a mounting assembly 826, a print media transport assembly 828, and an electronic controller 832. Data acquisition system 106 captures reference frames 112 and comparison frames 114 from substrate 102 using imaging areas 104A and 104B, respectively, and indicated by arrows 110A and 110B, respectively. Electronic controller 832 includes or forms processing system 108, and print media transport assembly 828 includes or forms positioning system 118.

In one embodiment, inkjet printhead assembly 822 includes one or more printheads 834 which eject drops of ink through a plurality of orifices or nozzles 833 and toward an embodiment of substrate 102, such as a print medium, so as to print onto substrate 102. Typically, nozzles 833 are arranged in one or more columns or arrays such that properly sequenced ejection of ink from nozzles 833 causes characters, symbols, and/or other graphics or images to be printed upon substrate 102 as inkjet printhead assembly 822 and substrate 102 are moved relative to each other.

In the embodiment of FIG. 8B, substrate 102 includes any type of suitable sheet material, such as paper, cardstock, transparencies, Mylar, cloth, and the like. Substrate 102 may also include a continuous form or continuous web print medium. As such, substrate 102 may include a plurality of continuous print medium sections. The print medium sections represent, for example, individual sheets, forms, labels, or the like which may be physically separated from each other by cutting or tearing along, for example, perforated lines. In addition, substrate 102 may include a continuous roll of unprinted paper with print medium sections individually delineated by indicia, openings, or other markings.

Ink supply assembly 824 supplies ink to inkjet printhead assembly 822 and includes a reservoir 825 for storing ink. As such, ink flows from reservoir 825 to inkjet printhead assembly 822. In one embodiment, inkjet printhead assembly 822 and ink supply assembly 824 are housed together to form an inkjet cartridge or pen. In another embodiment, ink supply assembly 824 is separate from inkjet printhead assembly 822 and supplies ink to inkjet printhead assembly 822 through an interface connection, such as a supply tube. In either embodiment, reservoir 825 of ink supply assembly 824 may be removed, replaced, and/or refilled.

Mounting assembly 826 supports inkjet printhead assembly 822 relative to print media transport assembly 828. Print media transport assembly 828 positions substrate 102 relative to inkjet printhead assembly 822. Thus, a print zone 837 is defined adjacent to nozzles 833 in an area between inkjet printhead assembly 822 and substrate 102. In one embodiment, inkjet printhead assembly 822 is a non-scanning or fixed printhead assembly. As such, mounting assembly 826 fixes inkjet printhead assembly 822 at a prescribed position relative to print media transport assembly 828. Thus, print media transport assembly 828 advances or positions substrate 102 relative to inkjet printhead assembly 822.

Electronic controller 832 communicates with inkjet printhead assembly 822, mounting assembly 826, and print media transport assembly 828. Electronic controller 832 receives data 833 from a host system, such as a computer, and includes memory for temporarily storing data 833. Typically, data 833 is sent to inkjet printing system 820 along an electronic, infrared, optical or other information transfer path. Data 833 represents, for example, a document and/or file to be printed. As such, data 833 forms a print job for inkjet printing system 820 and includes one or more print job commands and/or command parameters.

In one embodiment, electronic controller 832 provides control of inkjet printhead assembly 822 including timing control for ejection of ink drops from nozzles 833. As such, electronic controller 832 defines a pattern of ejected ink drops which form characters, symbols, and/or other graphics or images on substrate 102. Timing control and, therefore, the pattern of ejected ink drops is determined by the print job commands and/or command parameters.

In inkjet printing system 820, the relative position between data acquisition system 106 and printhead assembly 824 is fixed. Accordingly, print media transport assembly 828 adjusts the relative position between substrate 102 and data acquisition system 106 by moving substrate 102.

Displacement estimation system 800 is configured to perform displacement operations within inkjet printing system 820 as described above with reference to FIGS. 1-6B. Inkjet printing system 820 is configured to use the displacement, displacement sum, or total distance determined by displacement estimation system 800 to adjust the application of ink on substrate 102. Inkjet printing system 820 uses the displacement, displacement sum, or total distance subsequent to all adjustments by the predetermined distance being performed (e.g., adjustments shown in block 404 of FIG. 4A and block 426 of FIG. 4B). Accordingly, inkjet printing system 820 uses the displacement, displacement sum, or total distance to compensate for any offset from the desired nominal displacement from the steps of the predetermined distance.

In one embodiment, processing system 108 causes print media transport assembly 828 to adjust substrate 102 to a precise position using the displacement, displacement sum, or total distance. Inkjet printing system 820 then applies ink onto substrate 102 at a location determined by the precise position of substrate 102. For example, print media transport assembly 828 may adjust substrate 102 by the displacement sum using conventional mechanical encoder wheels (not shown) from a multi-step displacement operation prior to inkjet printing system 820 applying ink to substrate 102.

In another embodiment, inkjet printing system 820 uses the displacement, displacement sum, or total distance to select the ink nozzles 833 to use in applying ink to substrate 102. By selecting the ink nozzles 833, inkjet printing system 820 applies ink to selected locations on substrate 102 without adjusting substrate 102 using print media transport assembly 828.

In one embodiment, displacement estimation system 800 may be calibrated by printing a test page, examining the printing of the test page to detect any print deviations, and adjusting the predetermined distance to correct the print deviations.

Embodiments described herein may provide advantages over previous displacement systems. For example, multiple step displacement operations may be performed with a reduction in the overall measurement error.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
    a data acquisition system configured to capture a first reference frame that includes a first feature in a first imaging area on a substrate prior to a relative position between the data acquisition system and the substrate being adjusted by approximately a predetermined distance during a first time period, capture a first comparison frame that includes the first feature in a second imaging area on the substrate and a second reference frame that includes a second feature in the first imaging area on the substrate subsequent to the first time period, capture a second comparison frame that includes the second feature in the second imaging area on the substrate subsequent to the relative position being adjusted by approximately the predetermined distance during a second time period that is subsequent to the first time period, the second imaging area being separated from the first imaging area by the predetermined distance; and
    a processing system configured to determine a displacement sum using a first displacement between the first feature in the first reference frame and the first feature in the first comparison frame and a second displacement between the second feature in the second reference frame and the second feature in the second comparison frame.

2. The system of claim 1 wherein the processing system is configured to determine the displacement sum using the first displacement, the second displacement, and the predetermined distance.

3. The system of claim 1 wherein the first imaging area and the second imaging area are mutually exclusive.

4. The system of claim 3 wherein the processing system is configured to cause the positioning system to adjust the relative position by approximately the predetermined distance.

5. The system of claim 1 wherein the data acquisition system includes a first imaging system configured to capture the reference frame from a first field of view, and wherein the data acquisition system includes a second imaging system configured to capture the comparison frame from a second field of view.

6. The system of claim 1 wherein the data acquisition system includes an imaging system with a field of view that encompasses the first imaging area and the second imaging area.

7. The system of claim 1 wherein the data acquisition system includes an imaging system and a split field mechanism, and wherein the split field mechanism is configured to form a first field of view that encompasses the first imaging area and a second field of view that encompasses the second imaging area.

8. The system of claim 1 further comprising:
a positioning system configured to adjust the relative position by approximately the predetermined distance at the first time and the second time.

9. The system of claim 1 wherein the data acquisition system includes an optical system.

10. The system of claim 1 wherein the data acquisition system includes a non-optical system.

11. A method comprising:
capturing a reference frame that includes a feature in a first imaging area on a substrate using a data acquisition system;
adjusting a relative position between the substrate and the data acquisition system by approximately a predetermined distance with a positioning system subsequent to capturing the reference frame;
capturing a comparison frame that includes the feature in a second imaging area of the substrate using the data acquisition system subsequent to adjusting the relative position;
calculating a displacement between the feature in the reference frame and the feature in the comparison frame with a processing system;
repeating the steps of capturing the reference frame, adjusting the relative position, capturing the comparison frame, and calculating the displacement for a predetermined number of iterations; and
calculating a displacement sum by adding the displacement determined for each iteration with the processing system.

12. The method of claim 11 further comprising:
calculating the displacement sum by adding the displacement determined for each iteration and the predetermined distance for each iteration.

13. The method of claim 11 further comprising:
adjusting a relative position between the substrate and a functional unit with the positioning system using the displacement sum.

14. The method of claim 11 further comprising:
adjusting an operation performed on the substrate using the displacement sum.

15. The method of claim 11 further comprising:
calculating the displacement using an image cross-correlation algorithm.

16. The method of claim 11 further comprising:
calculating the displacement using a phase delay detection algorithm.

17. A system comprising:
a data acquisition system having a first imaging area and a second imaging area that are separated by a predetermined distance and configured to capture a first reference image that includes a first feature on a substrate using the first imaging area at a first time, a first comparison image that includes the first feature on the substrate using the second imaging area at a second time that is subsequent to the first time, a second reference image that includes a second feature on the substrate using the first imaging area at the second time, and a second comparison image that includes the second feature on the substrate using the second imaging area at a third time that is subsequent to the second time;
a positioning system configured to adjust a relative position between the data acquisition system and the substrate by approximately the predetermined distance between the first time and the second time and configured to adjust the relative position between the data acquisition system and the substrate by approximately the predetermined distance between the second time and the third time;
a processing system configured to determine a displacement sum using a first displacement between the first feature in the first reference frame and the first feature in the first comparison frame and a second displacement between the second feature in the second reference frame and the second feature in the second comparison frame; and
a functional unit configured to perform an operation on the substrate in accordance with the displacement sum.

18. The system of claim 17 wherein the processing system is configured to determine the displacement sum by adding the first displacement to the predetermined distance to generate a first total distance, adding the second displacement to the predetermined distance to generate a second total distance, and adding the first total distance to the second total distance.

19. The system of claim 17 wherein the functional unit is configured to cause the positioning system to adjust the relative position between the data acquisition system and the substrate using the displacement sum.

20. The system of claim 17 wherein the functional unit includes a printer configured to apply ink to the substrate at a location that is determined using the displacement sum.

* * * * *